(12) United States Patent
Baek et al.

(10) Patent No.: US 7,331,286 B2
(45) Date of Patent: Feb. 19, 2008

(54) METHOD FOR FABRICATING COLOR FILTER OF LIQUID CRYSTAL DISPLAY DEVICE

(75) Inventors: Myoung-Kee Baek, Gyeonggi-Do (KR); Jeong-Hyun Kim, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 314 days.

(21) Appl. No.: 10/602,744

(22) Filed: Jun. 25, 2003

(65) Prior Publication Data

US 2004/0126678 A1    Jul. 1, 2004

(30) Foreign Application Priority Data

Dec. 28, 2002    (KR) ............... 10-2002-0086039

(51) Int. Cl.
*B41M 1/10* (2006.01)
(52) U.S. Cl. ............... 101/170; 101/158; 430/7
(58) Field of Classification Search ........... 101/41, 101/154–155, 157–158, 58, 163, 170, 215; 430/7; 351/153
See application file for complete search history.

(56) References Cited

U.S. PATENT DOCUMENTS

| | | | |
|---|---|---|---|
| 4,294,650 A | 10/1981 | Werthmann | |
| 4,673,252 A * | 6/1987 | Kugo et al. | ............ 349/108 |
| 5,259,926 A | 11/1993 | Kuwabara et al. | |
| 5,514,503 A | 5/1996 | Evans et al. | |
| 5,544,582 A | 8/1996 | Bocko et al. | |
| 5,678,483 A | 10/1997 | Johnson | |
| 5,701,815 A | 12/1997 | Bocko et al. | |
| 6,001,515 A | 12/1999 | Evans et al. | |
| 6,356,318 B1 | 3/2002 | Kawahata | |
| 6,445,437 B1 * | 9/2002 | Miyazaki et al. | ............ 349/156 |
| 2003/0118922 A1 * | 6/2003 | Hayashi et al. | ............ 430/7 |
| 2004/0001177 A1 * | 1/2004 | Byun et al. | ............ 349/187 |

FOREIGN PATENT DOCUMENTS

| | | | |
|---|---|---|---|
| EP | 0 471 628 A1 | | 2/1992 |
| JP | 63-205608 | | 8/1988 |
| JP | 4-94115 | | 3/1992 |
| JP | 404134401 | * | 5/1992 |
| JP | 5-11270 | | 1/1993 |
| JP | 11-326621 | * | 11/1999 |
| JP | 2001166322 | * | 6/2001 |

* cited by examiner

*Primary Examiner*—Daniel J. Colilla
*Assistant Examiner*—Marissa Ferguson-Samreth
(74) *Attorney, Agent, or Firm*—McKenna, Long & Aldridge LLP

(57) ABSTRACT

A method of fabricating a color filter in an LCD device comprises providing a substrate which is divided into an active area for realizing image and a dummy area for not realizing image, providing a cliché having a plurality of grooves, filling Red, Green and Blue colored inks into the grooves of the cliché, transferring the Red, Green, and Blue colored inks from the cliché to a printing roll; positioning the Red, Green and Blue colored inks on the active area and dummy area of the substrate by rotating the printing roll on the substrate.

15 Claims, 7 Drawing Sheets

METHOD FOR FABRICATING COLOR FILTER OF LIQUID CRYSTAL DISPLAY DEVICE

This application is related to U.S. application Ser. No. 10/423,008, having the title "Pattern and Its Forming Method of Liquid Crystal Display Device" and filed on Apr. 25, 2003, which is hereby incorporated by reference for all purposes as if fully set forth herein.

This application claims the benefit of Korean Patent Application No. 2002-86039, filed on Dec. 28, 2002, which is hereby incorporated by reference for all purposes as if fully set forth herein.

BACKGROUND OF THE INVENTION

1. Field of the Invention

The present invention relates to a Liquid Crystal Display (LCD) device, and particularly, to a color filter of liquid crystal display device and method of fabricating a color filter in a liquid crystal display device which allows a simplified fabrication processes and to reduce fabrication cost.

2. Discussion of the Related Art

Cathode ray tube (CRT) monitors have mainly been used for displaying information in televisions and computers so far. The CRT has high image quality and brightness. However, as image screens grow larger, the depth of the CRT monitor becomes so big that the monitor occupies a very large volume. In addition, the weight of the CRT display has always been a problem in portable devices.

To address the problems above, flat panel display devices, such as liquid crystal displays, plasma display panels, organic electro luminescence displays, light emitting diodes and field emission displays, have been used instead of CRT monitors. Among these flat panel display devices, the liquid crystal display (LCD) device is used as a monitor of a notebook PC or of a desktop PC because the LCD has low power consumption. Color filters and a manufacturing thereof for a related art LCD device having all kinds of display applications will be described in detail with reference to FIGS. 1, 2A and 2B.

FIG. 1 is a view illustrating a cross-section of a related art general LCD device. As illustrated in FIG. 1, the LCD device includes a lower substrate 10, an upper substrate 20, and a liquid crystal layer 15 formed between the upper and lower substrates 10 and 20. A thin film transistor T and a pixel electrode 7 are formed on the lower substrate 10. The thin film transistor T includes a gate electrode 1 to which a scan signal is to be applied; a semiconductor layer 3 for transmitting a data signal corresponding to the scan signal; a gate insulating layer 2 for electrically isolating the semiconductor layer 3 and the gate electrode 1; a source electrode 4 formed on an upper part of the semiconductor layer 3 for applying the data signal; and a drain electrode 5 applying the data signal to the pixel electrode 7. The semiconductor layer 3 includes an active layer 3a formed by depositing amorphous silicon (a-Si) and an n+ doped ohmic contact layer 3b on both upper sides of the active layer 3a. A passivation layer 6 and the pixel electrode 7 are formed on the thin film transistor T, and a first alignment layer 4a formed for aligning liquid crystal molecules is formed on an upper part of the pixel electrode 7. The pixel electrode 7 is made by a transparent conductor, such as indium tin oxide (ITO) or indium zinc oxide (IZO), so that the light can be transmitted through the pixel electrode.

A black matrix 12 is formed on the upper substrate 20 for preventing the light from leaking between pixels, and color filters 11 of Red (R), Green (G), and Blue (B) for realizing actual colors are formed on the black matrix 12. A flattening or planarizing layer (not shown) can be additionally formed on the color filter 11 for flattening the color filter and for improving an adhesive bond to a common electrode 13 subsequently formed on the color filter. The common electrode 13 is for applying voltage to the liquid crystal layer 15. A second alignment layer 4b for aligning the liquid crystal molecules is formed on the common electrode 13. A transparent conductor, such as ITO or IZO, is used as the common electrode 13 such that the light can be transmitted through the common electrode.

The LCD device is made by repeating processes, such as thin film deposition, and photolithography and etching processes, for each color used in the LCD device. Fabrication methods for color filters include: the stain method, pigment disperse method, and an electrophotoresis deposition method. These three methods fabricate red, green, and blue primary color filters through three or more processes for each color of color filter.

The stain method includes processes for imparting photo-sensitivity to stainable polymer material, forming stain-subjected pattern, and staining the pattern with respective colors. In the color filter fabrication method of the stain method, a process of passing a stainable photosensitive film through the stain pattern is repeated for the respective R, G and B colors. Subsequently, the next step is forming a top coat layer.

The electrophotoresis deposition method includes steps of forming electrophotoresis deposition layers by extracting respective colors by electrophotoresis. However, the process for forming the electrophotoresis deposition layers on a transparent conductive layer has to be repeated three times to achieve each of the respective colors. Therefore, the fabrication process for the color filter takes a lot of time and has complicated process operations.

The pigment disperse method includes the steps of making a colored resist by dispersing the pigment on a resin and applying respective colored patterns. The steps of applying the colored resist and forming the colored pattern are repeated to achieve each of the respective Red, Green and Blue colors, and therefore, fabrication time is increased and cost is increased. Also, to form the respective R, G and B color filters, the colored resist is deposited across the entire substrate and portions except the necessary portion should be removed. Since only ⅓ of the entire resist sheet is needed, ⅔ of the entire resist sheet should be removed, and therefore, the resist is heavily wasted.

An ink jet method for forming the color filters precisely where the color filters should be positioned on an LCD device has been suggested for solving the problems in the above methods. The ink jet method provides Red (R), Green (G) and Blue (B) colored inks through an injection nozzle of an ink jet device onto to the lower substrate. The ink jet method can be used in the thin film transistor on color filter LCD device structure to prevent color filter mis-alignment and to improve the aperture ratio.

FIGS. 2A and 2B are views illustrating a fabrication method for a color filter of an LCD device in the ink jet method of the related art. As illustrated in FIG. 2A, the gate electrode 51, the gate insulating layer 52 and the semiconductor layer 53 of a thin film transistor are formed on the transparent lower substrate 50. Source and drain electrodes 54 and 55, which are separated from each other by a predetermined gap, are formed on the semiconductor layer 53 using photolithography. In addition, a photoresist is patterned to form an ink separating wall 56. A passivation layer 57 is then formed on the upper part of the wall 56 to protect the thin film transistor T.

As illustrated in FIG. 2B, the respective R, G and B colored inks 60a are injected through the injection nozzle 60 into the pixels using the colored ink separating wall 56. Subsequently, the colored inks 60a solidify to form a color filter 59 in each respective pixel 59. Accordingly, the waste of ink can be prevented since it is precisely positioned.

However, the color filters for each color all are positioned in a step separate from a step of positioning all of the color filters of another color. Therefore, the process is complex since subsequent color filters of one color have to be positioned amongst other already-positioned color filters of another color.

SUMMARY OF THE INVENTION

Accordingly, the present invention is directed to a method for fabricating a color filter of an LCD device and an LCD device using the same that substantially obviates one or more problems due to limitations and disadvantages of the related art.

An advantage of the present invention is to prevent ink from being wasted and to simplify processes for forming all of the color filters.

Another advantage of the present invention is to prevent a change of image quality, which can be generated in an actual active area due to mis-alignment in printing a color filter, by printing a dummy color filter on an outer portion of a substrate.

To achieve the advantages of the present invention, as embodied and broadly described herein, there is provided a method of fabricating a color filter for a Liquid Crystal Display (LCD) device including providing a substrate which is divided into an active area for realizing image and a dummy area for not realizing image; providing a cliché having a plurality of grooves; filling Red, Green and Blue colored inks into the grooves of the cliché; and repositioning the Red, Green and Blue colored inks from the cliché to the active area and the dummy area of the substrate.

In another aspect of the present invention, there is provided an A color filter substrate in a Liquid Crystal Display (LCD) device comprising: a substrate which is divided into an active area for realizing image and a dummy area for not realizing image, Red, Green and Blue color filters on the active area and the dummy area of the substrate, a black matrix for defining sub-pixels of red, green and blue on the substrate.

In another aspect of the present invention, a method of fabricating a color filter for a Liquid Crystal Display (LCD) device includes providing a substrate which is divided into an active area for realizing image and a dummy area for not realizing image; providing a cliché having a plurality of grooves; filling Red, Green and Blue colored inks into the grooves of the cliché; transferring the colored inks filled in the grooves of the cliché onto a printing roll by rotating the printing roll on the cliché in which the Red, Green and Blue colored inks are filled; and applying the Red, Green and Blue colored inks on the printing roll onto the active area and the dummy area of the substrate by rotating the printing roll across the substrate; and forming a black matrix on the substrate between the Red, Green and Blue colored inks of the active area and the dummy area.

In another aspect of the present invention, a color filter substrate for a Liquid Crystal Display (LCD) device includes a substrate which is divided into an active area for realizing image and a dummy area for not realizing image; Red, Green and Blue color filters on the active area and the dummy area of the substrate; and a black matrix for defining sub-pixels of red, green and blue on the substrate.

As described above, the colored inks are filled in the ink jet method, and therefore, the waste of the colored inks can be prevented. And since the patterns of Red, Green and Blue colors are formed simultaneously on the substrate using the printing method, repeated processes for the respective Red, Green and Blue colors can be reduced. Moreover, as the dummy color filter is formed on the outer portion of the substrate (dummy area where actual image is not realized), the change of image quality can be prevented even in case that a position of forming color filter is twisted or a printing error is generated on the outer portion of the active area (area for realizing image actually).

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

DETAILED DESCRIPTION OF THE ILLUSTRATED EMBODIMENTS

Reference will now be made in detail to embodiments of the present invention, examples of which are illustrated in the accompanying drawings.

Figure 3A:
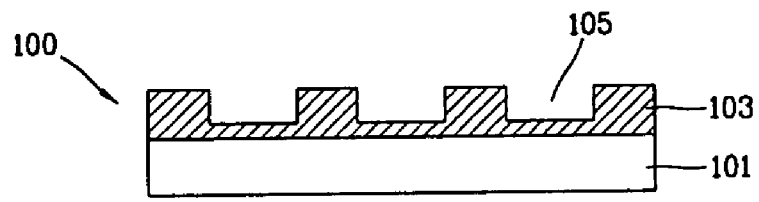
FIG. 3 is a view illustrating a fabrication method of a color filter according to exemplary embodiments of the present invention.

FIGS. 3A through 3F are processing views illustrating a method for fabricating color filters of an LCD device according to an exemplary embodiment of the present invention. As illustrated in FIG. 3A, a substrate 110 is provided with a buffer layer 103. For example, the buffer layer 103 can be a metallic, an organic or a silicon layer provided on the substrate 110. Subsequently, grooves 105 are formed in the buffer layer 103 through a photolithography process to form a cliché 100. The shape and position of the grooves 105 correspond to the R, G and B color filters, which will later be positioned on an LCD device.

Figure 3B:
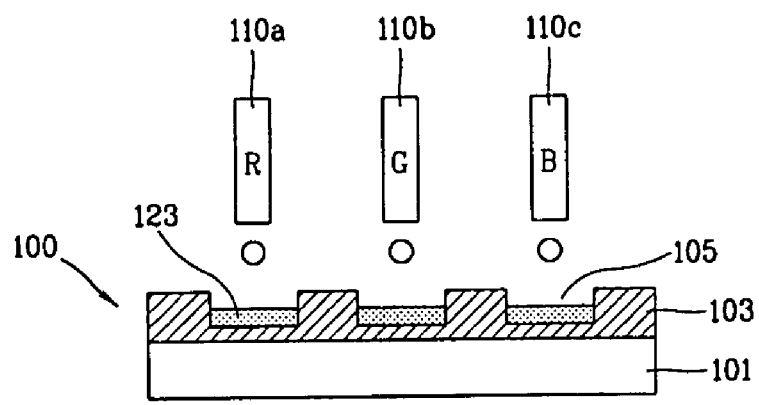

As illustrated in FIG. 3B, Red, Green and Blue colored inks are filled into the grooves 105 through the injection nozzles 110a~110c of respective Red, Green and Blue ink jet devices. The filling of colored ink 123 into the grooves 105 can be performed using the ink jet method. In the alternative, the ink jet device can include an ink supplying unit divided into Red, Green and Blue colors, nozzles through which the ink is injected, and channels that are disposed between the respective ink supplying unit and the nozzles, and paths for moving the ink. When the inks in the ink supplying unit is compressed, the inks of Red, Green and Blue colored inks are injected from the nozzles at the same time. Accordingly, the inks of Red, Green and Blue colored inks can be filled simultaneously or concurrently into the grooves 105 of the cliché 100. Thus, the ink filling time can be reduced and ink waste can be prevented.

Figure 3C:
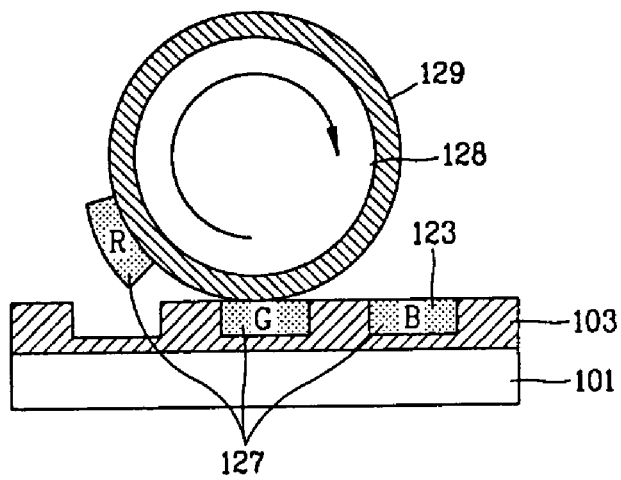

After the ink filling process is ended, the colored ink 123 filled into the cliché 100 is allowed to solidify. After the colored inks 123 have solidified enough to somewhat retain the shape of the groove 105, the colored inks 123 are separated from the buffer layer 103 and transferred onto a surface of a printing roll 128 as an ink pattern 127. As shown in FIG. 3C, a blanket 129 can be used on the surface of the printing roll 128 in order to improve adhesive bonding of the printing roll with the colored inks 123.

The buffer layer 103 makes the colored inks 123 separate easily from the cliché 100 such that the ink attaches onto the printing roll 128 easily and protects the substrate 130 from the shock of the printing roll 128. In other words, the adhesive bond of the colored ink 123 with the buffer layer 103 is weaker than the adhesive bond of the colored ink with the printing roll 128, and therefore, the ink will detach or be released from the buffer layer 103. In the alternative, the grooves 105 may be formed by etching the substrate without forming the buffer layer on the substrate 130. However, cracks may be generated on lower part of the substrate due to the impact of the printing roll 128. The buffer layer 103 protects the substrate by absorbing the impact of the printing roll 128.

The ink can be easily separated from the cliché 100 easily by using changes of adhesion property of the ink according to temperature differences between the cliché 100 and the printing roll 128. An ink having improved adhesion as temperature increases can be used such that the ink can be easily separated from the cliché 100 when the temperature of the printing roll 128 is set to be higher than that of the cliché 100. If the colored ink has the characteristic of improved adhesion as temperature decreases, the colored ink can be easily separated from the cliché 100 when the temperature of the printing roll 128 is set to be lower than that of the cliché 100.

Figure 3D:
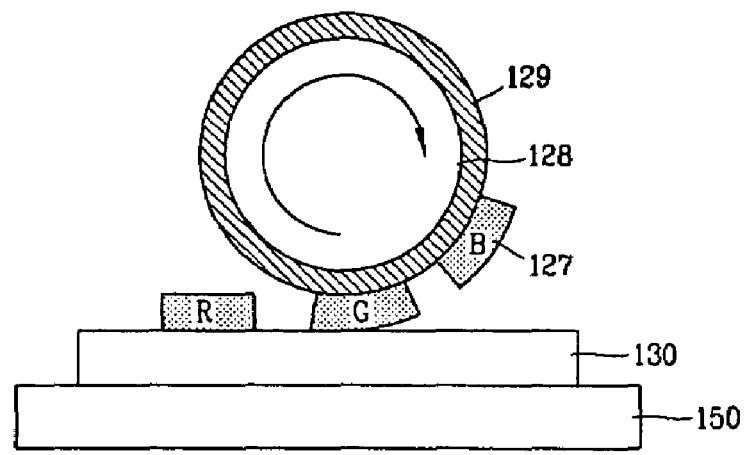

As illustrated in FIG. 3D, after transferring the colored ink filled in the cliché 100 onto the printing roll 128, the ink pattern 127 formed on the printing roll 128 is moved to a stage 150 on which a substrate 130 is disposed. The ink patterns 127 of R, G and B colored inks 123 are applied onto the substrate 130 by rotating the printing roll only once across the substrate. The ink patterns 127 applied to the substrate 130 form the R, G and B color filters 127*a*~127*c*. The temperature of the substrate 130 can be controlled by installing a heater (not shown) in the stage 150 to make the ink patterns detach from the printing roll 128 and to make the ink patterns attach easily onto the substrate 130. The heaters (not shown) installed on the cliché 100, the printing roll 128, and on the stage 150 should be independently controllable and also should be capability of maintaining even temperatures throughout entire areas of the cliché 100, the printing roll 128 and the stage 150.

Figure 3E:
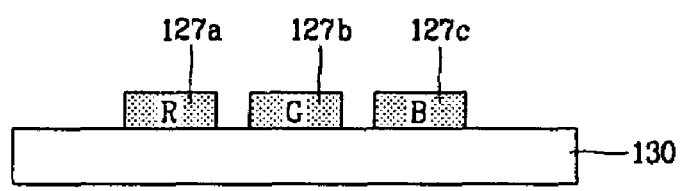

FIG. 3E illustrates color filters of R, G and B color filters 127*a*, 127*b* and 127*c* formed on the upper substrate 130 of an LCD device according to the above described processes. Generally, the color filters are formed by combining an ink jet method with a printing method to prevent ink from being wasted and to simplify the processes. As described above, the Red, Green and Blue color filters are formed sequentially one after another across the substrate without stopping to repeat the process for another color.

Figure 3F:
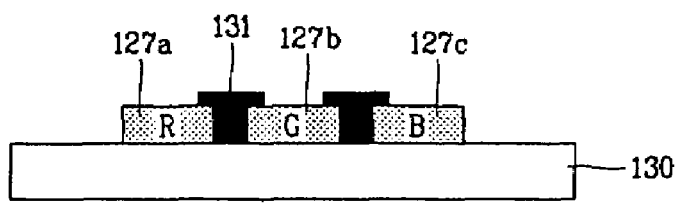

As illustrated in FIG. 3F, a black matrix 131 is deposited and patterned on the substrate 130 to be between the R, G and B color filters 127*a*, 127*b* and 127*c*. The black matrix 131 can be a resin, a metal or some other opaque material. In the alternative, the black matrix 131 could be formed on the substrate 130 prior to the printing of the R, G and B color filters 127*a*, 127*b* and 127*c*. If the black matrix 131 is formed on the substrate 130 first, the R, G and B color filters 127*a*, 127*b* and 127*c* are printed on the substrate such that they are aligned within the black matrix.

Figure 4:
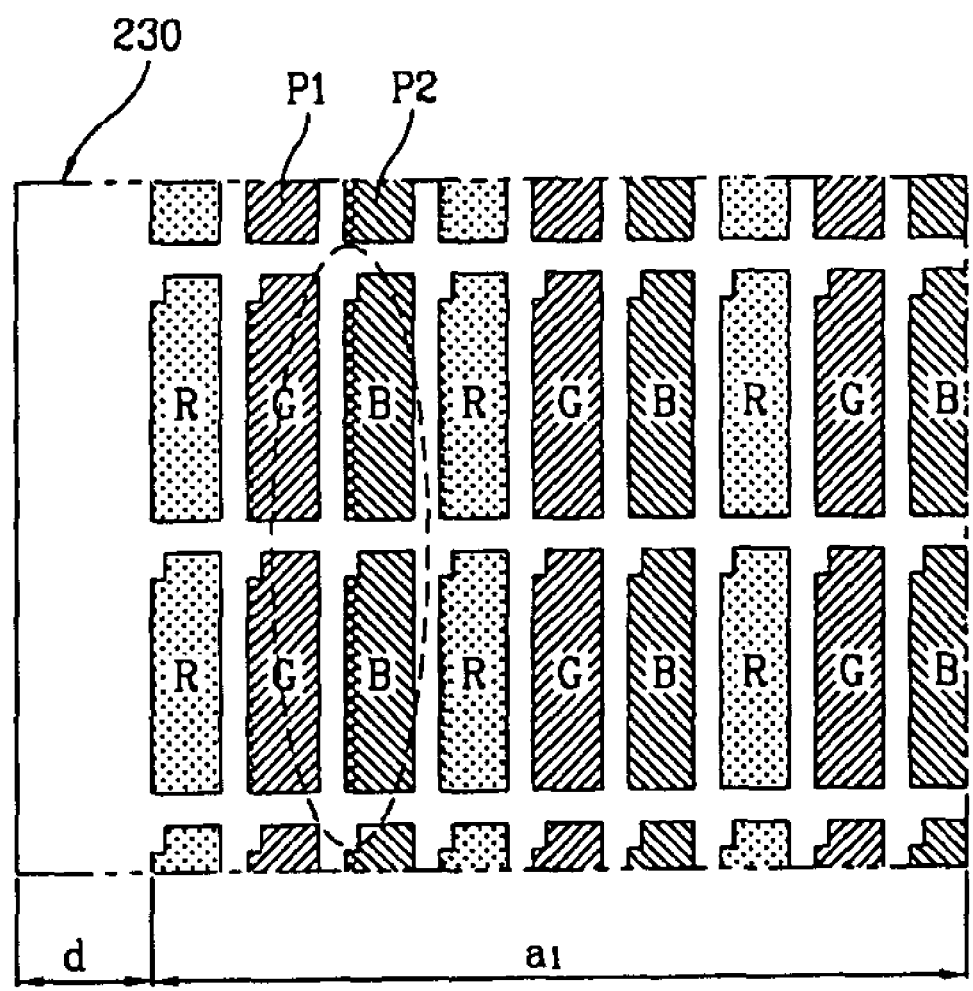
FIG. 4 is a view illustrating a line width change of the color filter generated on an outer portion of an active area when the color filter is formed in a printing.

However, the printing roll 128 applies a predetermined pressure to the substrate 130 as rotating, in the process of forming the color filters 127*a*, 127*b* and 127*c*. At that time, the pressure applied to the active area (area on which the image is displayed actually) of the substrate 130 by the printing roll 128 should be constant. However, the pressure applied to an outer portion of the active area is larger than that on the other area in actual printing process. This is because that the printing roll 128 does not remain absolutely parallel with the substrate 130. As larger substrates 130 are formed and the width of the printing roll 128 is increased to corresponding to the larger substrate, the difference of pressures on the outer and center portions of the active area becomes larger and larger. Therefore, as illustrated in FIG. 4, the width of the color filter that is formed on edge portion of the active area (a1) on the substrate 230 becomes too wide during the printing process and is formed even on neighboring pixel P2 besides the corresponding pixel P1. Thus, the color filter overlaps the other color filter of different color, and therefore, mixed color is generated and the color characteristic is reduced. Herein, d is a dummy area on outer portion of the substrate except the active area (a1).

Therefore, to solve the above problem, the color filter more than one pixel is formed until the dummy area (where the pixel is not formed) of neighboring substrate of the active area besides the active area which displays the image actually. Therefore, distortion of image quality generated on the edge portion of the active area can be prevented.

Figure 1:
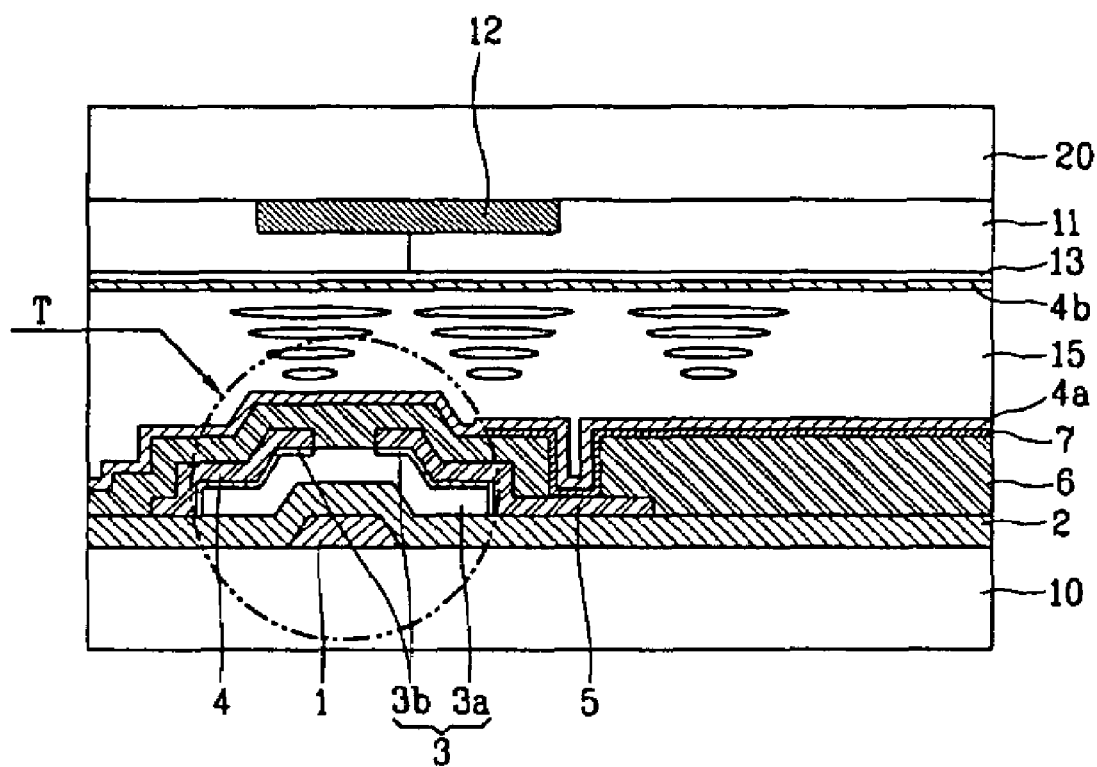
FIG. 1 is a cross-sectional view illustrating a general liquid crystal display (LCD) device in the related art.
Figure 2A:
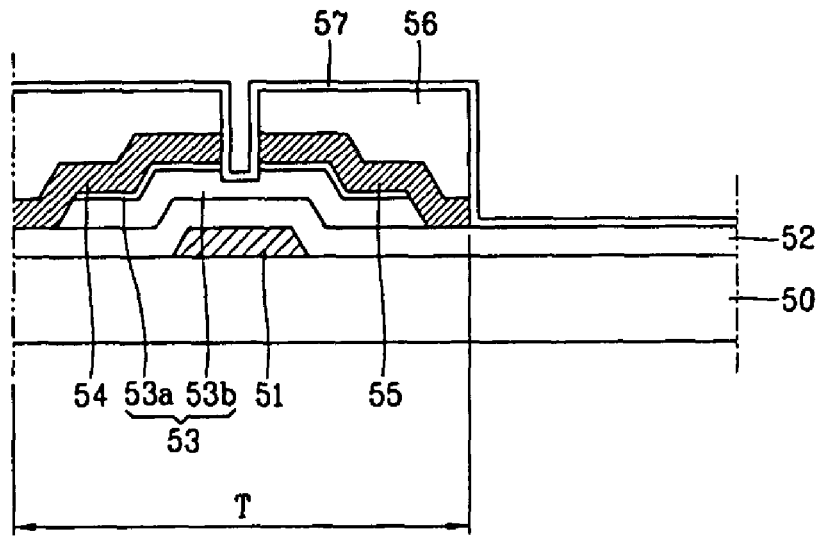
FIG. 2 is a view illustrating a fabrication method of a color filter in the related art in ink jet method.
Figure 2B:
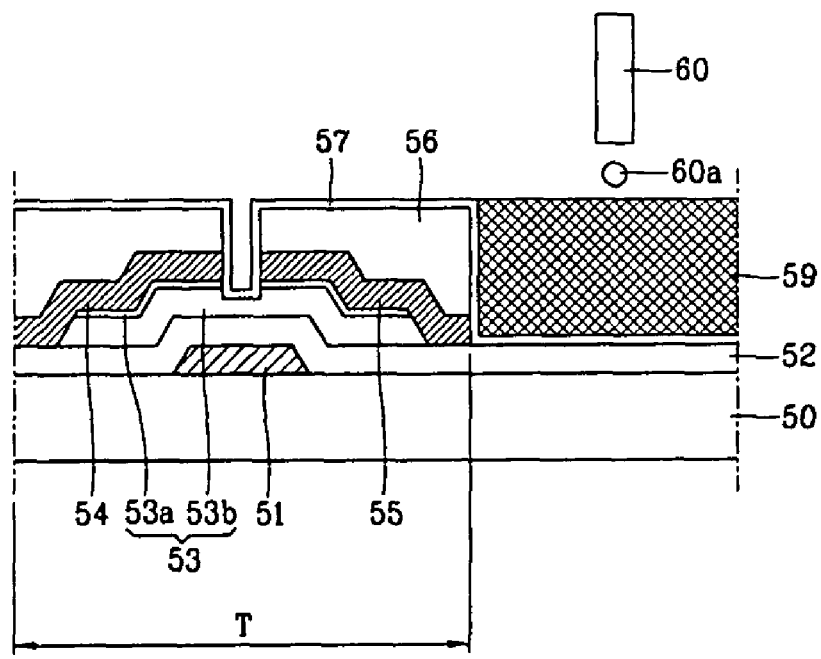
Figure 5:
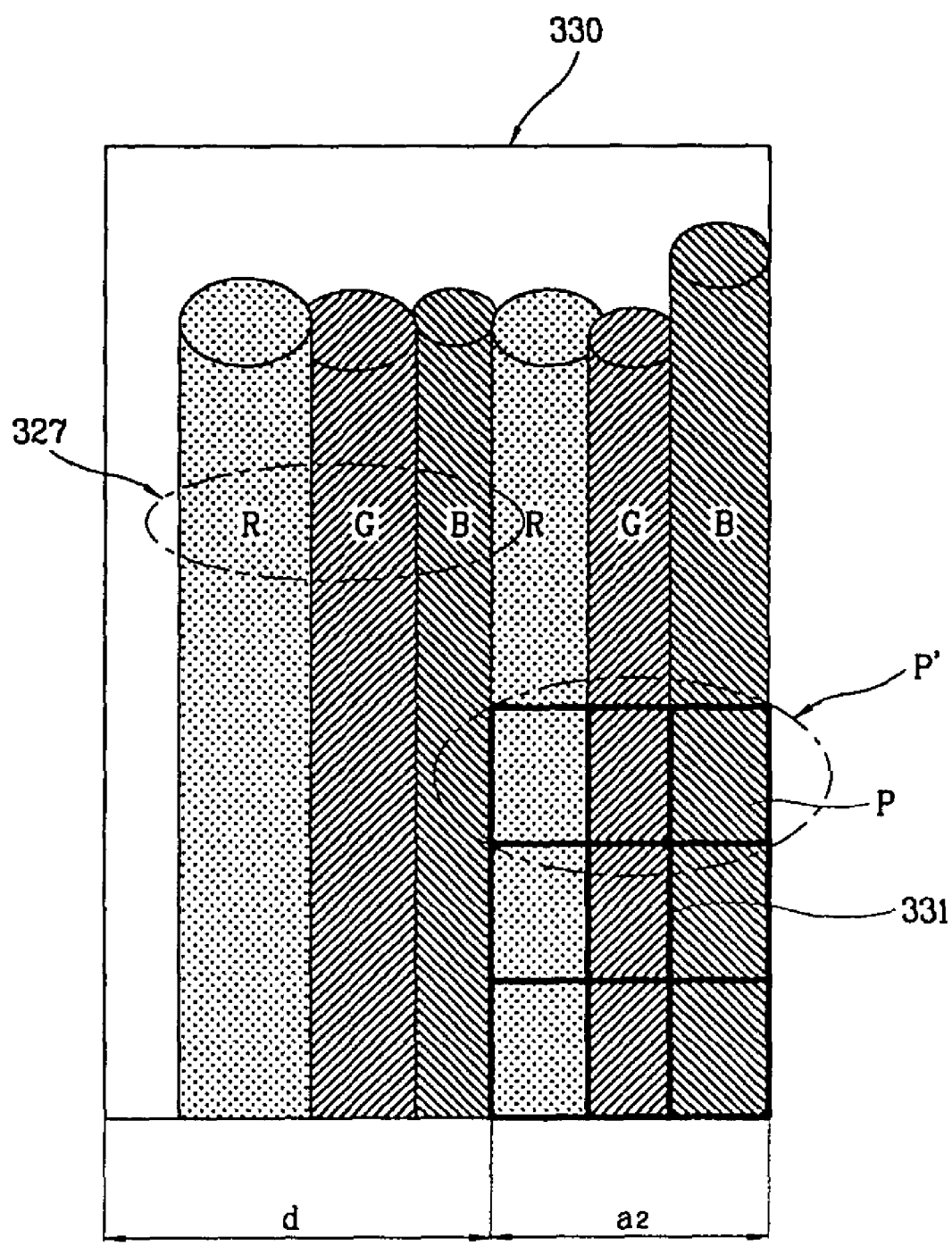
FIGS. 5 and 6 are views illustrating a fabrication method of the color filter which is able to prevent image quality from being changed on the active area.

FIG. 5 illustrates a fabrication method of the color filter according to the present invention which is capable of preventing image quality change on the active area. An edge portion of the substrate 330 including the active area (a2) and a dummy area (d) is illustrated in FIG. 5. As illustrated therein, sub-pixels (P) of the Red, Green and Blue color filters with a predetermined width are formed on the active area (a2), and the respective Red, Green and Blue sub-pixels are defined by the black matrix 331. In addition, although it is not shown in FIG. 5, a thin film transistor for switching the liquid crystal is formed on each of the subpixels (P), respectively (referring to FIG. 1). Herein, the three sub-pixels of Red, Green and Blue colors are defined as one pixel (P'). In addition, a color filter 327 of at least one or more pixels is formed on the dummy area (d), and the dummy color filter 327 formed on the dummy area (d) is referred to as a dummy color filter.

Figure 6:
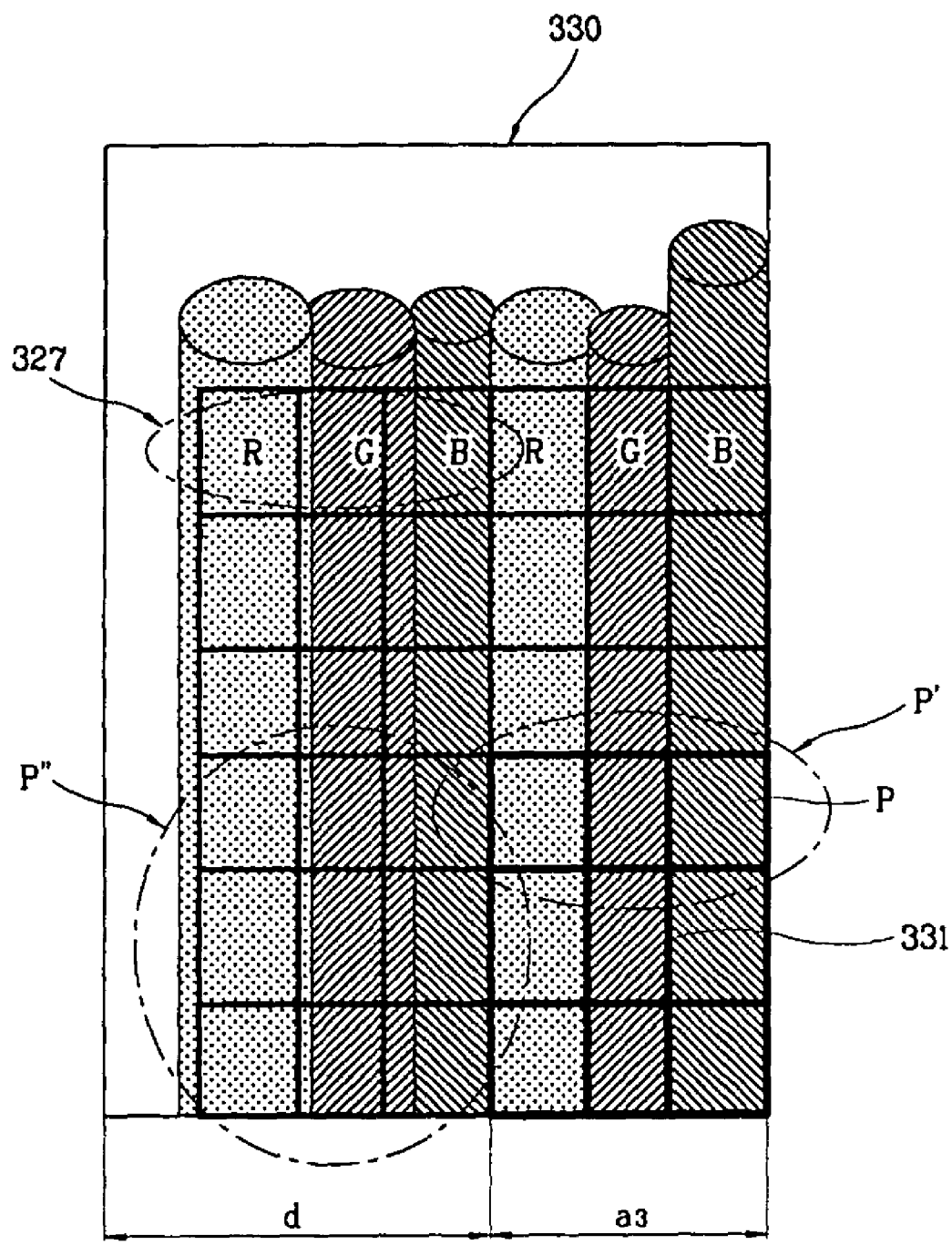

As described above, because at least one or more pixels of dummy color filter 327 is formed on the dummy area (d), accurate color filter can be formed on the active area (a2). That is, since the color filter is formed only until the active area in FIG. 4, alignment of the printing apparatus may be twisted, or the color filters formed on edge portion of the active area may be overlapped and colors mixed due to uneven pressure compressed on the substrate by the printing roll. However, as the color filter forming area is extended to the dummy area, the dummy color filter formed on the dummy area corresponds to the color filter formed on edge portion of the active area in FIG. 4, and normal color filter can be formed on the edge portion of the active area as on the center portion of the active area. On the dummy area, even if the overlapping of color filters or mixing of colors is generated, it does not affect to the image quality since the dummy area is not the area actually displaying the image. At that time, the dummy color filter 327 formed on the dummy area (d) should be at least more than one pixel. Or, as illustrated in FIG. 6, a dummy pixel (P''') can be added on the dummy area (d). Herein, the dummy pixel (P''') means a pixel actually formed same as that of the active area. That is, only Red, Green and Blue color filters are formed on the dummy area (d) in the previous embodiment, however, the black matrix for defining the respective Red, Green and Blue sub-pixels is formed on the dummy area according to the present embodiment. Accordingly, it can be identified that how much the R, G and B color filter patterns are changed when comparing to the desired line width though the black matrix.

At that time, it is desirable that at least one or more the dummy pixels (P''') are formed on the dummy area in order to identify the changing amount of the line widths on the Red, Green and Blue color filters.

As described above, according to the fabrication method of the color filter of the present invention, the colored inks of Red, Green and Blue colored inks are filled in the grooves of the cliché in the ink jet method, and after that, these are printed on the substrate at one time through the printing method. Therefore, the processes repeated in the related art can be omitted, and productivity can be increased.

Also, the colored inks are filled in the ink jet method to reduce the material cost, and thereby, price competitiveness can be improved.

Also, according to the present invention, as the dummy color filter is formed on the dummy area of the substrate, the image quality change which may be generated on the active area due to the mis-alignment during the printing process of the color filter can be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a color filter for a Liquid Crystal Display (LCD) device comprising:
   providing a substrate which is divided into an active area that contains pixels for realizing an image and a dummy area in the periphery of the active area that does not contain pixels for realizing an image;
   providing a cliché having a plurality of grooves;
   filling Red, Green and Blue colored inks into the grooves of the cliché; and
   repositioning the Red, Green and Blue colored inks from the cliché to the active area and the dummy area of the substrate wherein repositioning the Red, Green and Blue colored inks from the cliché includes transferring colored inks filled in the grooves of the cliché from the cliché onto a printing roll by rotating the printing roll over the colored inks on the cliché and,
   wherein the Red, Green, Blue colored inks are co-planar in the dummy area.

2. The method of claim 1, wherein filling includes placing the Red, Green and Blue colored inks into the grooves of the cliché concurrently.

3. The method of claim 1, wherein repositioning the Red, Green and Blue colored inks from the cliché further includes:
   applying the Red, Green and Blue colored inks on the printing roll onto the substrate by rotating the printing roll across the substrate.

4. The method of claim 3 wherein applying includes rolling the printing roll only once across the substrate.

5. The method of claim 1, further comprising:
   forming a black matrix on the substrate between the Red, Green and Blue colored inks on the active area.

6. The method of claim 1, further comprising:
   forming a black matrix between the Red, Green and Blue ink colored of the dummy area.

7. The method of claim 6, wherein forming a black matrix includes patterning a resin.

8. The method of claim 1, wherein Red, Green and Blue color inks on the dummy area of the substrate are formed in at least one or more pixels when it is assumed that respective red, green and blue sub-pixels are defined as one pixel.

9. A method of fabricating a color filter for a Liquid Crystal Display (LCD) device, comprising:
   providing a substrate which is divided into an active area that contains pixels for realizing image and a dummy area in the periphery of the active area that does not contain pixels for realizing image;
   providing a cliché having a plurality of grooves;
   filling Red, Green and Blue colored inks into the grooves of the cliché; transferring at least some of the colored inks filled in the grooves of the cliché onto a printing roll by rotating the printing roll on the cliché in which the Red, Green and Blue colored inks are filled; and
   applying the Red, Green and Blue colored inks on the printing roll onto the active area and the dummy area of the substrate by rotating the printing roll across the substrate to form respectively the Red, Green and Blue color filters and the Red, Green and Blue dummy color filters in the active area and the dummy area; and
   forming a black matrix on the substrate between the Red, Green and Blue colored inks of the active area and the dummy area.

10. The method of claim 9, wherein transferring further includes:
    applying the Red, Green and Blue colored inks on the printing roll onto the substrate by rotating the printing roll across the substrate.

11. The method of claim 10 wherein applying includes rolling the printing roll only once across the substrate.

12. A color filter substrate for a Liquid Crystal Display (LCD) device, comprising:
    a substrate which is divided into an active area for realizing image and a dummy area for not realizing image;
    Red, Green and Blue color filters on the active area of the substrate;
    Red, Green and Blue dummy color filters on the dummy area of the substrate; and
    a black matrix for defining sub-pixels of red, green and blue in the active area and in the dummy area on the substrate.

13. The device of claim 12, wherein Red, Green and Blue color filters on the dummy area of the substrate are in at least one or more pixels when it is assumed that respective red, green and blue sub-pixels are defined as one pixel.

14. The device of claim 12, wherein the black matrix is formed on the substrate between the Red, Green and Blue colored filters of the active area.

15. The device of claim 12, wherein the black matrix is formed on the substrate between the Red, Green and Blue colored filters of the dummy area.

* * * * *